United States Patent [19]
Oshima

[11] Patent Number: 5,665,945
[45] Date of Patent: Sep. 9, 1997

[54] PORTABLE CONTROLLER WITH DEADMAN SWITCH

[75] Inventor: Mikio Oshima, Fukuoka, Japan

[73] Assignee: Kabushiki Kaisha Yaskawa Denki, Fukuoka, Japan

[21] Appl. No.: 640,960

[22] PCT Filed: Aug. 7, 1995

[86] PCT No.: PCT/JP95/01862

§ 371 Date: May 10, 1996

§ 102(e) Date: May 10, 1996

[87] PCT Pub. No.: WO96/09147

PCT Pub. Date: Mar. 28, 1996

[30] Foreign Application Priority Data

Sep. 19, 1994 [JP] Japan ................. 6-251406

[51] Int. Cl.⁶ ...................................... H01H 9/00
[52] U.S. Cl. .......................... 200/1 R; 200/293.1
[58] Field of Search ................. 200/1 R, 293.1; 318/568.11

[56] References Cited

U.S. PATENT DOCUMENTS 4,990,729  2/1991  Toyoda et al. ............ 200/293.1
5,115,179  5/1992  Fujii et al. ................ 318/568.11
5,212,433  5/1993  Yasuyuki .................. 200/1 V

FOREIGN PATENT DOCUMENTS 63-70893   5/1988  Japan .
63-207580  8/1988  Japan .
3-190688   8/1991  Japan .
6-134685   5/1994  Japan .

Primary Examiner—Stuart N. Hecker
Attorney, Agent, or Firm—Jordan and Hamburg

[57] ABSTRACT

A deadman switch (4) comprises a pressing plate (5), a shaft (7) provided at the pressing plate (5), a dog plate (6) fitted over the shaft (7), a plurality of bosses (34), a spacer (9) fitted over the shaft (7), a spring (8) provided at the shaft outer circumferential portion, and three-point type limit switches (41), (42) attached on a back plate (3) and such that when dogs (41a), (42a) are engaged with the dog plate (6) so that the limit switches are in free state, they are turned OFF, when the dog plate (6) slightly pushes the dogs (41a), (42a), the limit switches are turned ON, and when the dog plate (6) comes into contact with the spacer (9) to further deeply push the dogs (41a), (42a) against spring force of the spring (8), the limit switches are turned OFF. Since this portable controller is securely turned OFF even if operator tightly grips the portable controller in the panic state based on runaway, etc. of robot, an extremely safety portable controller for robot of the fail-safe type can be provided.

1 Claim, 2 Drawing Sheets

PORTABLE CONTROLLER WITH DEADMAN SWITCH

TECHNICAL FIELD

This invention relates to a portable controller for robot, which carries out operation of instruction to an industrial robot.

BACKGROUND ART

Hitherto, when carrying out operation of instruction to an industrial robot, an operator grips or grasps a portable controller by one hand or both hands to push a key or keys on the controller by thumbs of the both hands or finger of hand by which the controller is not gripped (held). In the portable controller, so called a deadman (dead-man's type) switch such that it is operative for a time period during which the controller is touched by hand, and it is stopped when hand is away from the controller is assembled in view of safety in the operation of the robot. As a portable controller of this type, there is disclosed a portable controller in which, in order that respective finger tips come into contact with keys of the controller at the same time when the operator grips or holds the portable controller from the lateral direction, a pressing plate of the deadman switch is disposed at the back side of the portable controller, and an inclined surface is provided at the controller back side edge portion with which hand of the operator comes into contact (e.g., Japanese Patent Application Laid Open No. 207580/1988).

Moreover, there is disclosed a portable controller in which a finger fitting portion having a shape such that finger is fitted is provided on the back side of the portable controller in order that an operator dose not become tired even if he grips or holds it for a long time (e.g., Japanese Utility Model Application Laid Open No. 70893/1988).

Since the work for giving instruction to the robot is carried out near the robot body, it is necessary to imergently or immediately stop the robot for the purpose of protection of the operator when the robot runs away for any reason. As a momentary operation when the robot runs away, there are instances where the operator allows his hand to be away from the portable controller, or there are instances where he tightly grips or grasps the portable controller.

However, in the constitution in which the deadman switch which is stopped when operator's hand is away from the controller is assembled as described above, there was the drawback that when operator tightly grips the controller, its objective is not attained although there is the effect when operator's hand is away from the portable controller.

DISCLOSURE OF THE INVENTION

An object of this invention is to provide a portable controller for robot of the fail-safe type in which the switch is turned OFF both when operator allows his hand to be away from the portable controller and when he tightly grips or grasps the portable controller at the time of runaway of the robot.

To solve the above-mentioned problems, this invention is directed to a portable controller in which a finger fitting portion is provided at least at one side edge of, the back plate of a box-shaped casing (housing), and a deadman switch which is turned OFF when no pressure is applied to the finger fitting portion, is turned ON by pressing force (pressure) when the finger fitting portion is gripped, and is turned OFF when the finger fitting portion is pressed by pressing force (pressure) greater than pressing force (pressure) when the finger fitting portion is gripped is provided at the finger fitting portion, the deadman switch comprises a pressing plate which can be inserted into a recessed portion provided within the finger fitting portion and can be withdrawn therefrom, a shaft having a shape of offset provided at the pressing plate, a dog plate fitted over the offset portion of the shaft and having a plurality of holes at the circumferential edge of the shaft, a plurality of bosses adapted to be inserted into the plurality of holes of the dog plate, a spacer in contact with the respective top portions of the bosses, and fitted over the shaft, a spring provided at the shaft outer circumferential portion so that one end is supported in the state pressed onto a fixed portion provided at the shaft front end side and the other end presses the spacer, and a three point type limit switch attached on the back plate and such that when the dog is engaged with the dog plate so that the limit switch is in free state, it turned OFF, when the dog plate slightly presses the dog, it is turned ON, and when the dog plate comes into contact with the spacer to further deeply press the dog against spring force of the spring, it is turned OFF.

In the case where the operator tightly grips the finger fitting portion, the pressing plate is caused to be pressed into the recessed portion against spring force (pressure) of the spring, thus making it possible to place the limit switch in the OFF state of the third point through the shaft and the dog plate.

As described above, in accordance with this invention, since the portable controller is securely placed in OFF state even if operator tightly grips the portable controller in the panic state based on runaway, etc. of robot, an extremely safety portable controller for robot of the fail-safe type can be advantageously provided.

In addition, since the three point type limit switch is used, even if operator tightly grips the portable controller and then allows the hand to be away therefrom, there is no possibility that the industrial robot is brought into ON state even momentarily for a time period during which the limit switch of the portable controller is returned to the original position. Thus, higher safetey is advantagerously provided.

BRIEF DESCRIPTION OF THE DRAWINGS

FIG. 3 is an essential part side cross sectional view showing the operation of the embodiment of this invention, wherein

BEST MODE FOR CARRYING OUT INVENTION

An embodiment of this invention will now be described.

Figure 1:
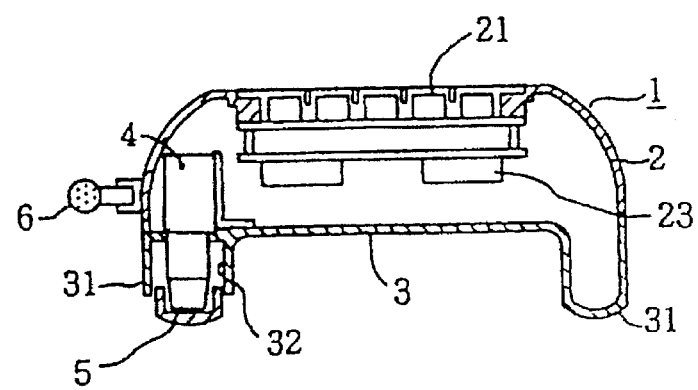
FIG. 1 is a view showing an embodiment of this invention.
Figure 2:
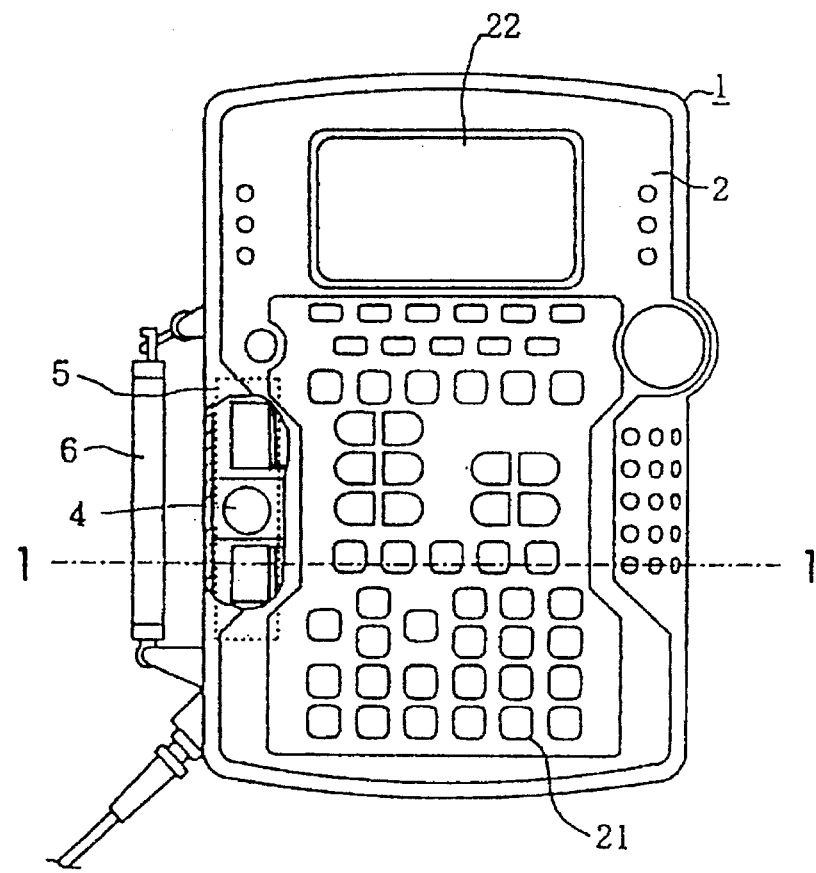
FIG. 2 is a plan view of FIG. 1.

FIG. 1 is an 1—1 cross sectional view shown in FIG. 2 of the embodiment of this invention, and FIG. 2 is a plan view, wherein a portable controller 1 includes a keyboard section 21 and a display section 22, and a box-shaped casing is composed of a face plate 2 for covering an operation circuit section 23 and a back plate 3 surrounding the operation circuit section 23 along with the face place 2. At the both side edges of the back plate 3, there are provided finger fitting portions 31 having curve shape projected toward the back side so that four fingers except for thumb are fitted in the state where no force is applied when operator grips the controller.

A recessed portion 32 is provided at the finger fitting portion 31 of the left side, and a deadman switch 4 is mounted on the bottom portion thereof. At the opening portion of the recessed portion 32, there is provided a pressing plate 5 having substantially the same curved surface as the finger fitting portion 31 and admitted into the recessed portion 32 so that it is subjected to insertion/ withdrawal, whereby when operator grips the finger fitting portion 31, the pressing plate 5 is pressed so that it is admitted into the recessed portion 32 to allow the deadman switch 4 to be operative.

A strap 6 is provided at the side surface of the face plate 2 to prevent that the portable controller 1 is fallen carelessly.

Figure 3A:
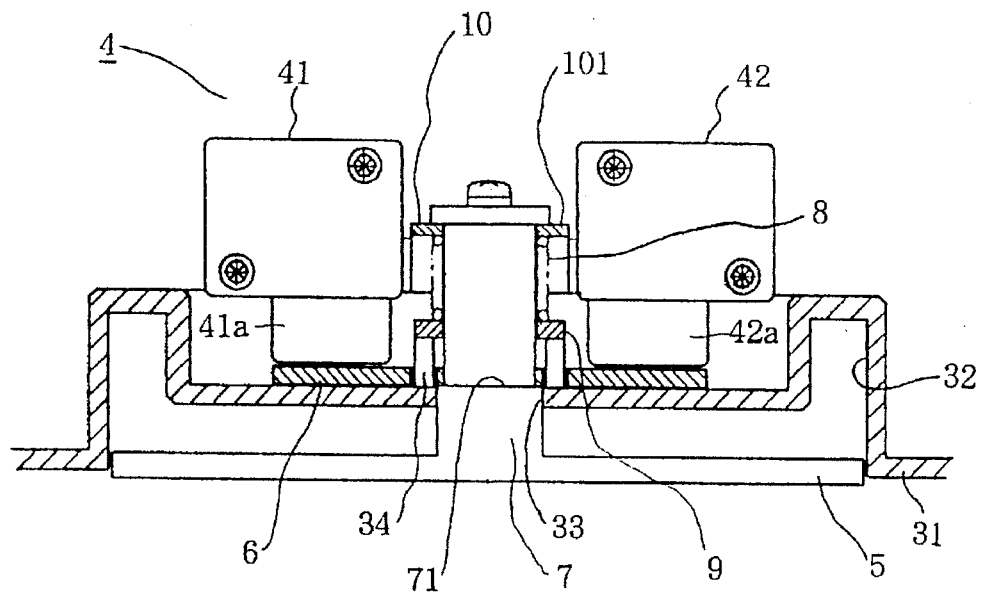
FIG. 3(a) shows the state of the first point where the three point type limit switch is not pushed.

The detailed structure of the deadman switch 4 is shown in FIG. 3.

A shaft 7 passed through a penetration hole 33 provided at the bottom portion of the recessed portion 32 is provided, and an offset portion 71 is provided at the shaft 7. Projected bosses 34 are provided, e.g., at four portions at the circumferential edge of the penetration hole 33. A dog plate 6 fitted over the shaft 7 and having holes greater than the boss 34 at the same four positions as those of the bosses 34 is in contact with the offset portion 71. A spacer 9 fitted over the shaft 7 is in contact with the top portion of the boss 34 and a spring 8 is provided between the spacer 9 and a collar portion 101 of a spring holding portion 10, wherein the lower end of the spring holding portion 10 is fixed on the back plate 3. The pressing plate 5 is fixed by screws to the end portion protruded toward the outside of the back plate 3 of the shaft 7.

At the back plate 3, two limit switches 41, 42 are provided in such a manner that they are opposite to the dog plate. The two limit switches 41, 42 perform the same action (function). If, e.g., limit switch 41 is failed (out of order), since the limit switch 42 is operating, there is no possibility that the function is lost. These limit switches 41, 42 are three point type limit switch. They are set so that in the free state, they are turned OFF, when dogs 41a, 42a are slightly pressed, they are turned ON, and when dogs 41a, 42a are further deeply pressed, they are turned OFF. In addition, the limit switches 41, 42 are set so that when these dogs 41a, 42a are returned to the original state from the state where they are deeply depressed, they are returned directly to the initial OFF state without routing the ON state.

In the state where operator does not grip the portable controller 1, the dog plate 6 is thrust or forced to the back plate 3 by pressure of springs provided within the limit switches 41, 42. As a matter of course, the limit switches 41, 42 are in OFF state.

Figure 3B:
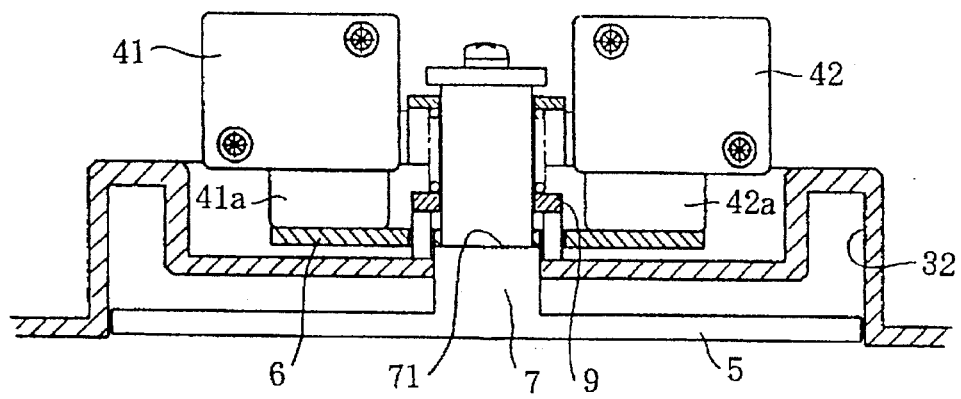
FIG. 3(b) shows the state of the second point where the three point type limit, switch is lightly or slightly pushed.

In the case where operator grips the portable controller 1 to operate it, he grips the finger fitting portion 31 along with the pressing plate 5. At this time, as shown in FIG. 3(b), the pressing plate 5 is inserted into the recessed portion 32 so that the dog plate 6 presses the dogs 41a, 42a to slightly push these dogs 41a, 42a into the limit switches 41, 42. In this state, the dog plate 6 operates the limit switches 41, 42, thus placing the operation circuit in the ON state where operation of instruction, etc. can be made.

In the case where any necessity to urgently stop the operation of the robot takes place by runaway thereof, so operator allows his finger (hand) to be instantaneously or momemtarily away from the finger fitting portion 31, the shaft 7 and the pressing plate 5 are pushed down through the dog plate 6 and the offset portion 71 of the shaft 7 by spring pressure of spring (not shown) within the limit switches 41, 42. Thus, the limit switches are returned to the OFF state shown in FIG. 3(a).

Figure 3C:
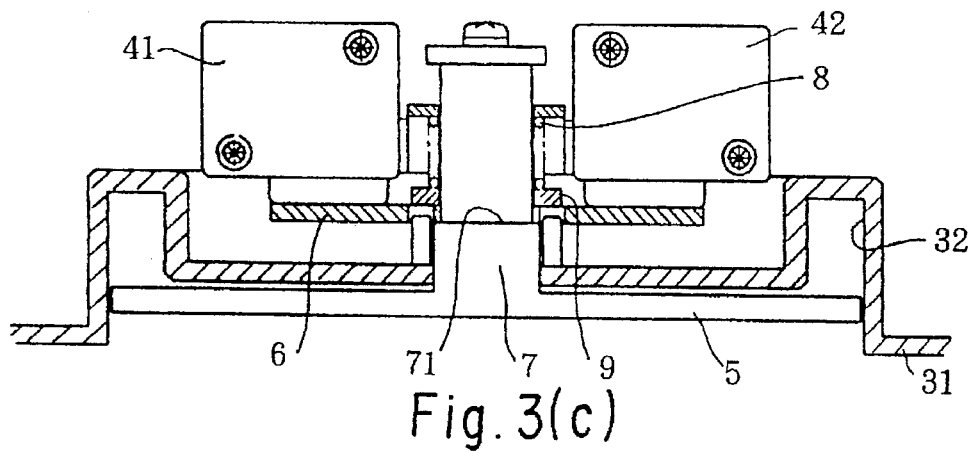
FIG. 3(c) shows the state of the third point where the three point type limit switch is strongly or deeply pushed.

Alternatively, in the case where operator instantaneously tightly grips the finger fitting portions 31 along with the pressing plate by runaway, etc. of robot, the pressing plate 5 is pushed into the recessed portion 32 against spring pressure of spring 8 from the state of FIG. 3(b) to allow the dog plate 6 to compress the spring 8 through the spacer 9 as shown in FIG. 3(c) to allow the dog plate 6 to operate the limit switches 41, 42 to cause them in the OFF state of the third point. Further, when operator allows his finger to be away from the finger fitting portion 31 from the above state, the limit switches 41, 42 are returned to the original state while maintaining OFF state.

While the deadman switch 4 is provided at the finger fitting portion of the left side, such deadman switch 4 may be provided at the finger fitting portion of the right side for left handed operator, or those switches may be provided at the both sides.

Industrial Applicability

This invention can be utilized, when applied to a portable controller for robot which carries out operation of instruction to industrial robot, in the field for manufacturing and providing portable controllers for robot of extremely high safety.

I claim:

1. A portable controller in which a finger fitting portion is provided at least at one side edge of a back plate of a casing, and a deadman switch which is turned OFF when no pressure is applied to the finger fitting portion, is turned ON by pressing force (pressure) when the finger fitting portion is gripped, and is turned OFF when the finger fitting portion is pressed by pressing force (pressure) greater than the pressing force (pressure) when the finger fitting portion is gripped, wherein the deadman switch comprises a pressing plate which can be inserted into a recessed portion provided at the finger fitting portion or can be withdrawn therefrom, a shaft having shape of an offset provided at the pressing plate, a dog plate fitted over the offset portion of the shaft and having a plurality of holes at the circumferential edge of the shaft, a plurality of bosses inserted into the plurality of holes of the dog plate, a spacer in contact with the respective top portions of the bosses and fitted over the shaft, a spring provided at the shaft outer circumferential portion so that one end is supported in the state pressed onto a fixed portion provided at the shaft front end side, and the other end presses the spacer, and a three-point type limit switch attached on the back plate, and such that when the dog is engaged with the dog plate so that the limit switch is in free state, the limit switch is turned OFF, when the dog plate slightly pushes the dog, the limit switch is turned ON, and when the dog plate comes into contact with the spacer to push the dog more deeply against spring force of the spring, the limit switch is turned OFF.

* * * * *

UNITED STATES PATENT AND TRADEMARK OFFICE
CERTIFICATE OF CORRECTION

PATENT NO. : 5,665,945
DATED : September 9, 1997
INVENTOR(S) : Mikio OSHIMA

It is certified that error appears in the above-indentified patent and that said Letters Patent is hereby corrected as shown below:

On the Title page, change the PCT filing date from " [22] PCT Filed: Aug. 7, 1995" to -- [22] PCT Filed: September 19, 1995--.

Signed and Sealed this

Sixth Day of January, 1998

Attest:

BRUCE LEHMAN

Attesting Officer    Commissioner of Patents and Trademarks